United States Patent

Baeuerle et al.

[11] Patent Number: 5,157,231
[45] Date of Patent: Oct. 20, 1992

[54] APPARATUS FOR INDUCTIVE HARDENING CRANKSHAFTS WITH CRANK PINS HAVING A HOLLOW GROUND RADIUS

[75] Inventors: Hans Baeuerle, Aalen-Wasseralfingen; Lula, Josef, Ellwangen, both of Fed. Rep. of Germany

[73] Assignee: Maschinenfabrik Alfing Kessler GmbH, Fed. Rep. of Germany

[21] Appl. No.: 644,881

[22] Filed: Jan. 22, 1991

[30] Foreign Application Priority Data

Jan. 23, 1990 [DE] Fed. Rep. of Germany ....... 4001887

[51] Int. Cl.⁵ .............................................. H05B 6/10
[52] U.S. Cl. ................... 219/10.57; 219/10.67; 219/10.71; 219/10.79; 266/129; 266/125; 148/572; 148/526
[58] Field of Search ................ 148/150, 146, 154, 152; 219/10.43, 10.57, 10.59, 10.79, 10.71, 10.67; 266/129, 125

[56] References Cited

FOREIGN PATENT DOCUMENTS

| 1209137 | 1/1966 | Fed. Rep. of Germany . |
| 3613909 | 1/1987 | Fed. Rep. of Germany . |
| 3842808 | 8/1989 | Fed. Rep. of Germany . |
| 255360 | 10/1927 | Italy . |

*Primary Examiner*—R. Dean
*Assistant Examiner*—Sikyin Ip
*Attorney, Agent, or Firm*—Welsh & Katz, Ltd.

[57] ABSTRACT

A method for the inductive hardening of working surfaces and transition radii on crankshafts in which, to receive connecting rods, crank pins are disposed directly one after another at different angular attitudes in planes at right-angles to the axis of rotation is disclosed. By the subject invention, adjacently disposed inductors are applied against the crank pins from the same side. Both inductors are disposed in the region between the two serially disposed crank pins and are spaced apart from each other.

7 Claims, 2 Drawing Sheets

APPARATUS FOR INDUCTIVE HARDENING CRANKSHAFTS WITH CRANK PINS HAVING A HOLLOW GROUND RADIUS

FIELD OF INVENTION

The invention relates to a method for the inductive hardening of working surfaces and transition radii on crankshafts on which, to accommodate connecting rods, crank pins of different angular attitudes are disposed directly one after another in planes at right-angles to the axis of rotation, the working surfaces and transition radii of the directly serially disposed crank pins being simultaneously and rotatingly hardened. The invention similarly relates to an apparatus for inductive hardening of the aforementioned kind.

PRIOR ART

A method and an apparatus of these types are described in DE-PS 36 13 909. In those cases, two inductors engage like half-shells around directly serially disposed crank pins, being disposed opposite and offset to one another. As a result of the joint hardening process, it is possible to avoid unacceptable reciprocal influencing which occurs when the crank pins are separately hardened. However, a disadvantage is that the apparatus for carrying out this method has to be constructed on a custom basis and for this reason is relatively expensive.

DE-PS 38 42 808 describes an apparatus for hardening crankshafts, two crank-bearing surfaces which are disposed symmetrically along their axial center and simultaneously hardened. However, this apparatus is not usable with a crank drive of a V-type internal combustion engine in which the crank pins are disposed directly one after another at different angular attitudes. For such a crank drive, this apparatus would probably not be suitable because of the need to maintain a minimum spacing in the suspension and in the machine frame of adjacently disposed inductor units.

EP-OS 304 651 describes a crank drive of an internal combustion engine of the V-type but contemplates an intermediate member between the two mutually offset crank pins. In this case, hardening of the working surface is accomplished by induction hardening in separate operations. If for example the left-hand crank pin is being hardened, then the right-hand crank pin must be cooled in order to minimize mutual influencing. Another disadvantage is that the intermediate members necessarily make the crank drive longer or less bearing surface would be available.

SUMMARY OF THE INVENTION

The present invention is therefore based on the problem of avoiding the aforementioned problems and particularly of providing an opportunity of simultaneously and inductively hardening the working surfaces of directly and serially disposed crank pins. In the present invention, this is performed in a relatively simple manner, making it possible to use simpler and possibly conventional apparatuses for such purposes.

According to the subject invention, this problem is resolved in that the adjacently disposed inductors are applied against the crank pins from the same side, the two inductors being spaced from each other in the region between the two serially disposed crank pins.

According to the subject invention, now, despite the absence of intermediate members, it is possible in one operation to simultaneously carry out inductive hardening of the two working surfaces, with a good hardening pattern being achieved. In particular, in the case of the method according to the invention, the critical zones, such as the flexurally stressed inside faces and the torsion stressed zone of the overlap of the two crank pins, can be given particularly careful treatment.

One of the causes of a regular hardening pattern is that in the region between the two inductors the heat from the two working surfaces converges. Consequently, also in this area the temperature required for the hardening process is achieved while generally avoiding localized over-temperatures.

By virtue of the fact that both inductors are on the same side and may thus be disposed beside each other in the same machine frame, the hardening process becomes substantially easier. In particular, it is possible to convert conventional hardening machines at no great expense to accommodate the method according to the invention. In such cases, it is only necessary that the heating loops be so positioned that the heat also converges between the two spaced-apart inductors.

In the case of an apparatus according to the invention for carrying out the method, it is possible to provide for the two inductors to be in each case suspended by a suitable suspension means with at least one of the two inductors being given a cranked or offset shape in the direction of the other inductor, the two inductors being so disposed in respect of each other that a free zone still remains at least in the transition zone between the two serially disposed crank pins; the free zone thus corresponds in general to the hollow ground radius of the crank pin.

In order to avoid excessive reciprocal influencing by the magnetic fields of the two inductors which occur during inductive hardening, an advantageous further development of the invention provides for the two inductors to be magnetically screened on their facing or adjacent sides. In one embodiment, this can be accomplished by an electrically conductive panel or panels disposed on the mutually facing sides of one or both inductors. The mechanical energy is dissipated in the panels by conversion to heat. Additional cooling may be required to carry off this excess heat.

It is also possible for the side plate of the inductor to be used for dissipating the energy between adjacent inductors with suitable modifications.

Complete electrical isolation is achieved with at least one insulator plate, which can also be used for alignment and accurate spacing of the two inductors. Generally, it would be sufficient if for this purpose one of the two inductors is provided with an insulating plate. Should it be required, however, two insulating plates may also be used for symmetry purposes Usually, the inductors are suspended in a parallelogram, being radially guided by the parallelogram and now, according to the invention, being guided in an axial direction by the insulating plates which help to align the inductors. If desired, the two inductors can slide on each other over the two insulating plates.

A further advantage of the method according to the subject invention lies in the fact that now the areas which are mostly in danger of flexion and torsion in the crank pins can be treated separately from one another. For the same reason, generally, also each inductor can be provided with its own power control arrangement so that independent control of each inductor is possible.

DETAILED DESCRIPTION OF THE DRAWINGS

The principle of an example of embodiment according to the invention is described in greater detail hereinafter with reference to the accompanying drawings, in which.

The principle and mode of operation of surface hardening by means of inductors has long been known and will not be dealt with in detail here. Basically, higher-frequency voltages are used briefly to induce an eddy current in the surface zone of the work piece which is to be hardened When this happens, the surface of the work piece becomes rapidly heated to a certain temperature. Hardening is then accomplished by quenching with a coolant.

Figure 1:
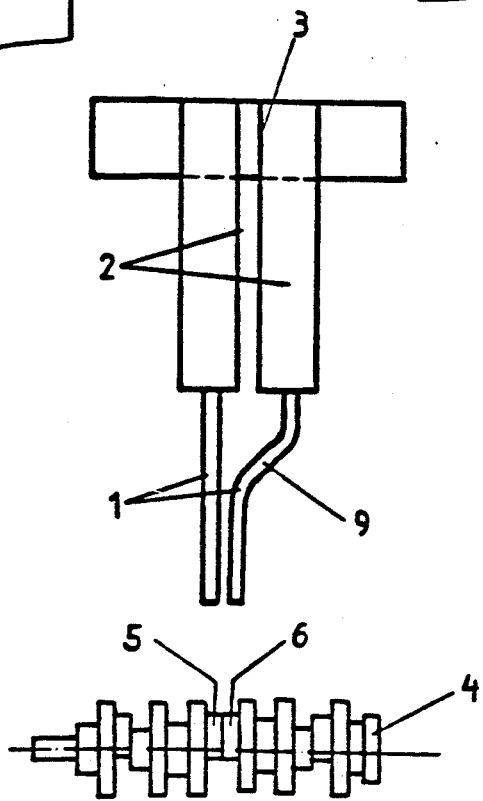
FIG. 1 shows a reduced view of a crank shaft with two inductors which are suspended on a common machine frame.

By way of simplification, FIG. 1 shows only two adjacent inductors 1 which are mounted on a machine frame 3 by a suspension means 2. Via the suspension means 2, the inductors 1 are selectively displaceable along a crank shaft 4 which is to be hardened. The position of the inductors 1 are separately adjustable relative to the crank pins which are to be hardened. Of course, as many adjacent inductors may be used as there are surfaces to be hardened.

Figure 2:
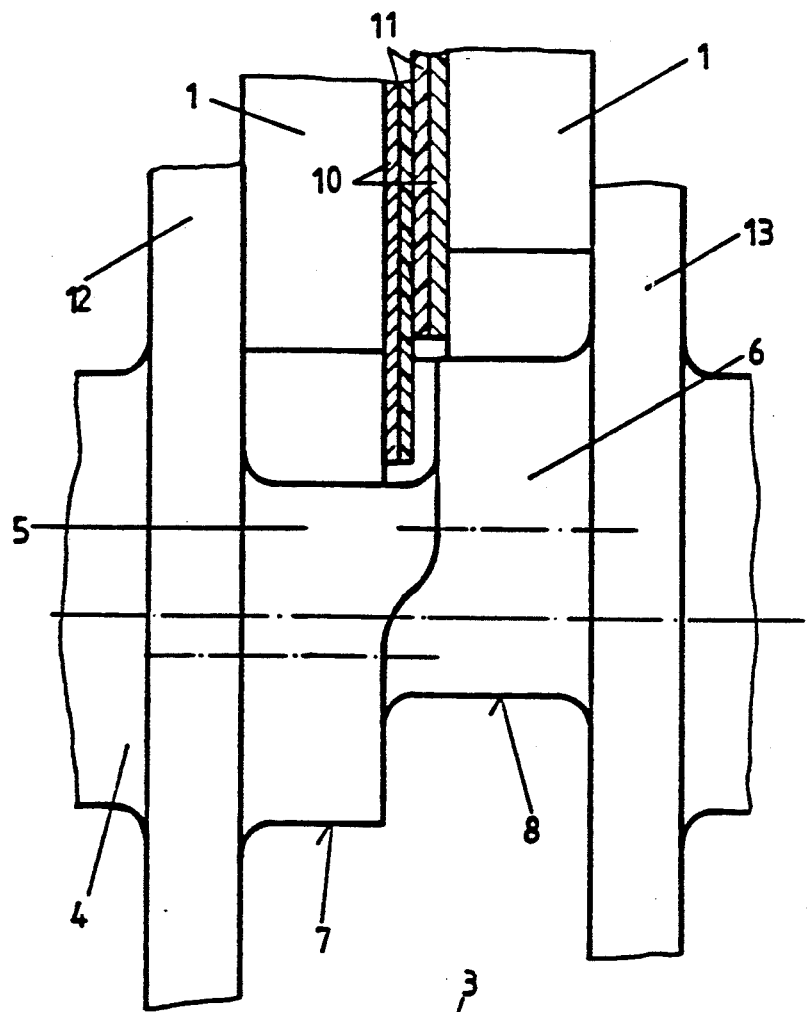
FIG. 2 is a partial enlarged side view of a crank shaft with two inductors.

The crank shaft shown in FIG. 1 is conceived for a V-type internal combustion engine, in each case two crank pins 5 and 6 being disposed at different angular attitudes and directly one behind the other in the plate at right-angles to the axis of rotation (FIG. 2). As such, there are overlapping working surfaces 7 and 8 in a longitudinal direction on the crank pins. Both the suspension means 2 and the other components such as the transformer (not shown), disposed for each inductor 1 on the machine frame 3, require room for location in an axial direction in relation to the crank shaft 4 which is to be hardened.

As can be seen from FIG. 1, an inductor can be provided with a cranked or offset portion 9 which is directed at the other inductor 1. This cranked portion can be provided without loss of electrical energy. The second inductor may also have a cranked shape directed at the adjacent inductor for hardening the adjacently disposed crank pin.

As can also be seen from FIG. 2, both inductors have on their adjacent sides an electrically conductive plate 10 which can be of copper, brass, aluminum, austenitic steel, or the like. On the outside of each plate is disposed an insulating plate 11 for magnetic screening purposes. The spacing between the two adjacently disposed inductors is at least a distance which corresponds to the hollow ground radius of the crank pin. As can be seen from FIG. 2, the two insulating plates 11 bear against one other and thereby comprise guides or alignment means for the inductors 1, all in cooperation with the side members 12 and 13 and crank pins 5 and 6. Synthetic plastic material or the like of low frictional resistance and good lubricity may be used for the insulating plates 11.

Figure 3:
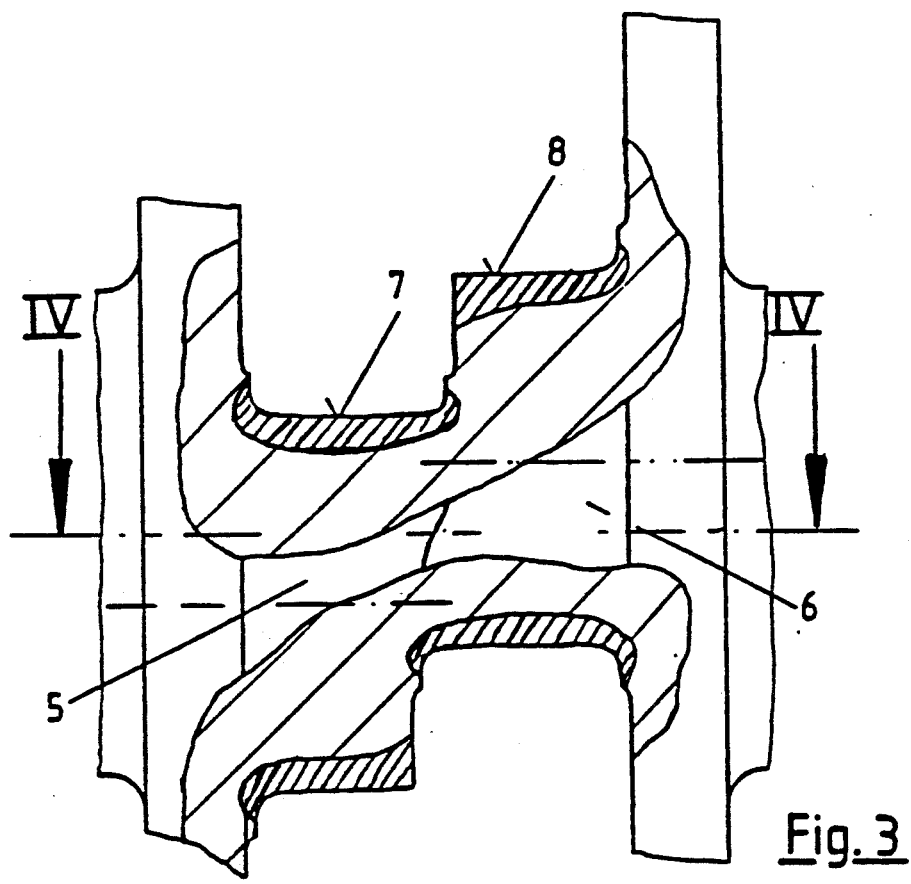
FIG. 3 is a partial view of the crank shaft according to FIG. 1 with the zones to be hardened, shown as cross-hatched.
Figure 4:
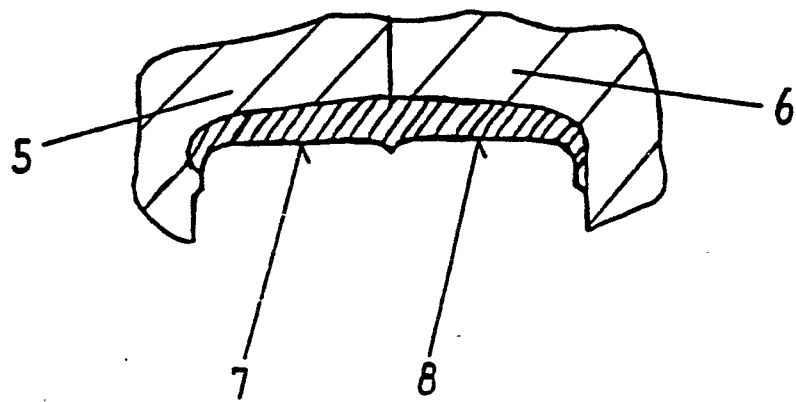
FIG. 4 shows a section taken on the line IV—IV in FIG. 3 with the zone to be hardened being cross-hatched.

FIGS. 3 and 4 show the pattern of the hardening zones which result from hardening by means of the two inductors 1 shown in FIGS. 1 and 2. As is readily evident, the pattern of the zones to be hardened or the depth of penetration of the hardening is distributed relatively evenly over the working surfaces 7 and 8, with a sufficiently deep hardening zone also being present in the critical areas and in the radii.

FIG. 4 shows that in the selected free middle zone, i.e. the zone in which the two crank pin working surfaces are adjacent, there is a depth of hardening which ensures a substantially even pattern over the two working surfaces 7 and 8.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. An apparatus for the inductive hardening of working surfaces and transition radii on crankshafts having crank pins of different angular attitudes, each of said crank pins having a hollow ground radius, and adjacent one another in planes at right-angles to the axis of rotation of said crank shaft, comprising at least two inductors, a suspension means supporting each inductor for positioning on the same side of said crank shaft, at least one of said inductors being offset in the direction of an other inductor, each of said inductors being spaced from one another at least the distance corresponding to the hollow ground radius of the crank pin.

2. An apparatus according to claim 1, wherein one of said inductors has an electrically conductive plate on a side thereof.

3. An apparatus according to claim 2, wherein said electrically conductive plate comprises a material selected from the group consisting of copper, brass, aluminum and austenitic steel.

4. An apparatus according to claim 2, further including an insulating plate disposed adjacent an outer side of said electrically conductive plate.

5. An apparatus according to claim 4, wherein the insulating plate is a guide plate for the inductors.

6. An apparatus according to claim 5, wherein said insulating plate is formed of a material having good lubricity.

7. An apparatus for the inductive hardening of working surfaces and transition radii on crankshafts having crank of different angular attitudes and adjacent one another in planes at right-angles to the axis of rotation of said crank shaft, said crank pins connected by side members, said apparatus comprising at least two inductors, each inductor having a support end and an opposite end, a suspension means supporting each inductor on said support end for positioning said opposite end of each inductor on the same side of said crank shaft, at least one of said inductors being offset in the direction of the other inductor, said inductors being positioned between said side members.

* * * * *